(12) United States Patent
Lovell, Jr.

(10) Patent No.: US 7,805,148 B2
(45) Date of Patent: Sep. 28, 2010

(54) SYSTEM AND METHOD FOR LOCATION TRANSPARENCY

(75) Inventor: Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 0 days.

(21) Appl. No.: 11/763,588

(22) Filed: Jun. 15, 2007

(65) Prior Publication Data

US 2008/0200185 A1 Aug. 21, 2008

Related U.S. Application Data

(60) Provisional application No. 60/814,047, filed on Jun. 16, 2006.

(51) Int. Cl.
*H04W 68/00* (2009.01)
(52) U.S. Cl. .............. 455/456.3; 455/456.1; 455/456.2; 455/457; 455/456.6
(58) Field of Classification Search .............. 455/435.1, 455/456.1–456.6, 457
See application file for complete search history.

(56) References Cited

U.S. PATENT DOCUMENTS

| 6,038,451 | A | | 3/2000 | Syed et al. |
|---|---|---|---|---|
| 6,320,534 | B1 | * | 11/2001 | Goss ........................ 342/357.1 |
| 2002/0086683 | A1 | * | 7/2002 | Kohar et al. ................. 455/456 |
| 2002/0181684 | A1 | * | 12/2002 | Logan .................... 379/201.02 |
| 2003/0040314 | A1 | * | 2/2003 | Hogan et al. ................. 455/435 |
| 2003/0060212 | A1 | * | 3/2003 | Thomas ....................... 455/456 |
| 2003/0125876 | A1 | * | 7/2003 | Root et al. ...................... 702/3 |
| 2006/0111112 | A1 | * | 5/2006 | Maveddat .................... 455/439 |
| 2006/0135139 | A1 | * | 6/2006 | Cheng et al. ................. 455/418 |
| 2007/0229549 | A1 | * | 10/2007 | Dicke et al. .................. 345/676 |

* cited by examiner

*Primary Examiner*—Vincent P Harper
*Assistant Examiner*—Dung Lam
(74) *Attorney, Agent, or Firm*—Edell, Shapiro & Finnan, LLC

(57) ABSTRACT

A service that augments a key element of Unified Messaging and Unified Communications initiatives—i.e., Mobile Subscriber Location Awareness—to enhance substantially the value, usefulness, etc. of the presence awareness, place shifting, etc. components of such initiatives. The service may optionally leverage the capabilities of a centrally-located, full-featured Messaging Inter-Carrier Vendor.

17 Claims, 4 Drawing Sheets

```
                                                              500
502
  MSs
  MSId    Name     CurrentLocationId
  -----   ------   -----------------
  1001    Mary     2003
  .
  .

504
  Locations
  LocationId   MSId   Description            Latitude   Longitude
  ----------   ----   --------------------   --------   ---------
  2001         1001   Home                   φ1         λ1
  2002         1001   Work - Building 1      φ2         λ2
  2003         1001   Work - Office          φ3         λ3
  2004         1001   Work - Conference Room φ4         λ4
  2005         1001   School - John          φ5         λ5
  2006         1001   School - Jane          φ6         λ6
  2007         1001   Shopping Mall          φ7         λ7
  2008         1001   Other                  N/A        N/A
  .
  .

506
  Contacts
  ContactID   MSId   Description            Value
  ---------   ----   --------------------   --------------------
  3001        1001   Home Telephone         703-555-1234
  3002        1001   Mobile Telephone (A)   703-555-9876
  3003        1001   Mobile Telephone (B)   703-555-8765
  3004        1001   Work Telephone         703-555-3456
  3005        1001   Personal IM            Mary37
  3006        1001   Work IM                MaryCorp2
  3007        1001   Personal E-Mail        Mary37@SomeMailSvc.com
  3008        1001   Work E-Mail            Mary.Smith@xyz.com
  .
  .

508
  Associations
  AssociationId   LocationId   ContactId   Priority
  -------------   ----------   ---------   --------
  4001            2001         3001        1
  4002            2001         3007        2
  4003            2001         3005        3
  4004            2003         3004        1
  4005            2003         3008        2
  4006            2008         3002        1
  .
  .
```

502
MSs

| MSId | Name | CurrentLocationId |
|------|------|-------------------|
| 1001 | Mary | 2003 |
| . | | |
| . | | |

500

504
Locations

| LocationId | MSId | Description | Latitude | Longitude |
|------------|------|-------------|----------|-----------|
| 2001 | 1001 | Home | $\varphi_1$ | $\lambda_1$ |
| 2002 | 1001 | Work - Building 1 | $\varphi_2$ | $\lambda_2$ |
| 2003 | 1001 | Work - Office | $\varphi_3$ | $\lambda_3$ |
| 2004 | 1001 | Work - Conference Room | $\varphi_4$ | $\lambda_4$ |
| 2005 | 1001 | School - John | $\varphi_5$ | $\lambda_5$ |
| 2006 | 1001 | School - Jane | $\varphi_6$ | $\lambda_6$ |
| 2007 | 1001 | Shopping Mall | $\varphi_7$ | $\lambda_7$ |
| 2008 | 1001 | Other | N/A | N/A |
| . | | | | |
| . | | | | |

506
Contacts

| ContactID | MSId | Description | Value |
|-----------|------|-------------|-------|
| 3001 | 1001 | Home Telephone | 703-555-1234 |
| 3002 | 1001 | Mobile Telephone (A) | 703-555-9876 |
| 3003 | 1001 | Mobile Telephone (B) | 703-555-8765 |
| 3004 | 1001 | Work Telephone | 703-555-3456 |
| 3005 | 1001 | Personal IM | Mary37 |
| 3006 | 1001 | Work IM | MaryCorp2 |
| 3007 | 1001 | Personal E-Mail | Mary37@SomeMailSvc.com |
| 3008 | 1001 | Work E-Mail | Mary.Smith@xyz.com |
| . | | | |
| . | | | |

508
Associations

| AssociationId | LocationId | ContactId | Priority |
|---------------|------------|-----------|----------|
| 4001 | 2001 | 3001 | 1 |
| 4002 | 2001 | 3007 | 2 |
| 4003 | 2001 | 3005 | 3 |
| 4004 | 2003 | 3004 | 1 |
| 4005 | 2003 | 3008 | 2 |
| 4006 | 2008 | 3002 | 1 |
| . | | | |
| . | | | |

FIG. 5

SYSTEM AND METHOD FOR LOCATION TRANSPARENCY

This application claims the benefit of U.S. Provisional Patent Application No. 60/814,047, filed on Jun. 16, 2006, which is herein incorporated by reference in its entirety.

BACKGROUND

1. Field of the Invention

The present invention relates generally to telecommunications services. More particularly, the present invention relates to capabilities that enhance substantially a key element of Unified Messaging (UM) and Unified Communications (UC) initiatives—i.e., Mobile Subscriber (MS) Location Awareness (LA).

2. Background of the Invention

As the 'wireless revolution' continues to march forward the importance to a MS, for example a user of a Wireless Device (WD) such as a cellular telephone or a BlackBerry that is serviced by a Wireless Carrier (WC), of their WD grows substantially.

For example, under UM and UC schemes or environments, among other things, the storage, management, presentation, etc. of multiple messaging paradigms or models (including, inter alia, voice, Short Message Service [SMS], Multimedia Message Service [MMS], Internet Protocol [IP] Multimedia Subsystem [IMS], Instant Messenger [IM], Electronic Mail [E-Mail], facsimile transmission [FAX], etc.) are dynamically adapted to match or otherwise meet the unique requirements, needs, etc. of a MS' particular circumstances and are subsequently exposed or offered to a MS' WD through mechanisms such as Session Initiation Protocol (SIP), Real-time Transport Protocol (RTP), Session Initiation Protocol for Instant Messaging and Presence Leveraging Extensions (SIMPLE), eXtensible Messaging and Presence Protocol (XMPP), etc.

A key element in the determination of a MS' 'particular circumstances' (as referenced above) is knowledge of the current physical location of a MS' WD—i.e., MS LA.

MS LA-based service offerings are of particular interest to, for example, individuals who are 'on call' for business reasons (e.g., technical support, etc.) or for personal reasons (e.g., a medical condition such as organ transplantation, pregnancy, etc.), first responders, individuals within a large corporate environment, etc.

The present invention extends key elements of wireless technology to augment MS LA-based offerings and addresses various of the (not insubstantial) challenges that are associated with same thereby incrementally enhancing the value, usefulness, etc. of the presence awareness, place shifting, etc. components of UM and UC schemes or environments.

SUMMARY OF THE INVENTION

Embodiments of the present invention provide a service that augments a key element of UM and UC initiatives—i.e., MS LA—to enhance substantially the value, usefulness, etc. of the presence awareness, place shifting, etc. components of such initiatives.

In an embodiment of the invention a Service Provider (SP) (1) receives a location update from a WC indicative of the current physical location of a MS's WD, (2) completes one or more processing steps on the received location update using, possibly inter alia, information that was previously supplied by the MS, and (3) updates one or more elements within a repository with the results of the processing steps.

In another embodiment of the invention a SP (1) receives a location inquiry from a requester, (2) processes the received inquiry, and (3) dispatches one or more response messages, containing current location information, to the requester. The location inquiry and the response messages may transit any number of channels including, possibly inter alia, SMS, MMS, IMS, IM, E-Mail, a Web-based facility, etc.

In another embodiment of the invention a SP (1) receives a contact inquiry from a requester, (2) processes the received inquiry, and (3) dispatches one or more response messages, containing current contact information, to the requester. The contact inquiry and the response messages may transit any number of channels including, possibly inter alia, SMS, MMS, IMS, IM, E-Mail, a Web-based facility, etc.

In still another embodiment, there is provided a method for providing contact information for a mobile subscriber. Registration information is received from a mobile subscriber including information about predetermined locations frequented by the mobile subscriber and contact information is further received corresponding to at least some of said predetermined locations. A wireless carrier providing service to the mobile subscriber provides an indication of a current location of a wireless device belonging to the mobile subscriber.

A query for contact information for the mobile subscriber is received and then, based, at least in part, on the indication of the current location of the wireless device belonging to the mobile subscriber, one of the predetermined locations frequented by the mobile subscriber is identified as a present location of the mobile subscriber. The contact information corresponding to the present location of the mobile subscriber, if any, is then selected, and a message, in response to the query, is generated and sent, then message including the contact information corresponding to the present location of the mobile subscriber.

These and other features of the embodiments of the present invention along with their attendant advantages will be more fully appreciated upon a reading of the following detailed description in conjunction with the associated drawings.

BRIEF DESCRIPTION OF THE DRAWINGS

FIG. 5 presents illustrative contents of an exemplary data model.

DETAILED DESCRIPTION OF THE INVENTION

The present invention may leverage the capabilities of a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/functions/etc. that are performed by a MICV, and a discussion of the numerous advantages that arise from same.

Figure 1:
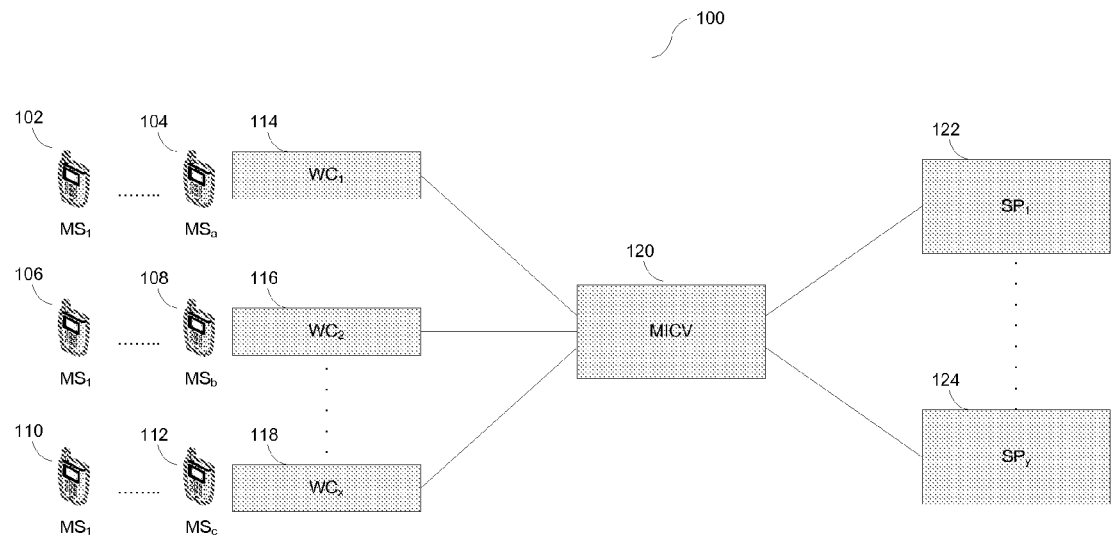
FIG. 1 is a diagrammatic presentation of an exemplary Messaging Inter-Carrier Vendor (MICV).

As illustrated by FIG. 1 and reference numeral 100 a MICV 120 is disposed between, possibly inter alia, multiple WCs ($WC_1$ 114 → $WC_x$ 118) on one side and multiple SPs ($SP_1$ 122→SP$_y$ 124) on the other side and thus 'bridges' all of the connected entities. A MICV 120 thus, as one simple example, may offer various routing, formatting, delivery, value-add, etc. capabilities that provide, possibly inter alia:

1) A WC, WC$_1$ 114→WC$_x$ 118 (and by extension all of the MSs [MS$_1$ 102→MS$_a$ 104, MS$_1$ 106 →MS$_b$ 108, MS$_1$ 110→MS$_c$ 112] that are serviced by a WC [WC$_1$ 114→WC$_x$ 118]), with ubiquitous access to a broad universe of SPs (SP$_1$ 122→SP$_y$ 124), and 2) A SP (SP$_1$ 122→SP$_y$ 124) with ubiquitous access to a broad universe of WCs (WC$_1$ 114→WC$_x$ 118 and, by extension, to all of the MSs [MS$_1$ 102→MS$_a$ 104, MS$_1$ 106→MS$_b$ 108, MS$_1$ 110→MS$_c$ 112] that are serviced by a WC [WC$_1$ 114→WC$_x$ 118]).

Generally speaking a MICV may have varying degrees of visibility (e.g., access, etc.) to the (MS↔MS, MS↔SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV it will be readily apparent to one of ordinary skill in the relevant art that numerous other arrangements are equally applicable and indeed are fully within the scope of the present invention.

In the discussion below the present invention is described and illustrated as being offered by a SP. A SP may, for example, be realized as a third-party service bureau, an element of a WC or a landline carrier, an element of a MICV, multiple third-party entities working together, etc.

In the discussion below reference is made to messages that are sent, for example, between a MS and a SP. As set forth below, a given 'message' sent between a MS and a SP may actually comprise a series of steps in which the message is received, forwarded and routed between different entities, including possibly inter alia a MS, a WC, a MICV, and a SP. Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

To better understand the particulars of the present invention consider for a moment a simple hypothetical example—SP SP$_x$ offers a service that has been enhanced or augmented as provided through the instant invention and Mary, a MS, uses SP$_x$'s service.

Figure 2:
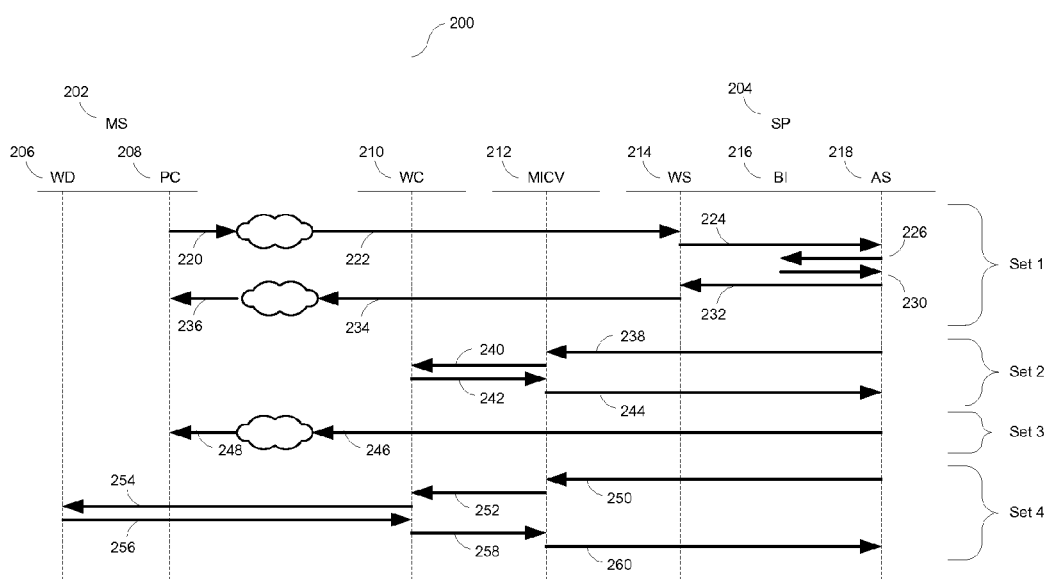
FIG. 2 illustrates various of the exchanges or interactions that are supported by aspects of the present invention.

FIG. 2 and reference numeral 200 illustrate various of the exchanges or interactions that might occur under a portion of our hypothetical example. Of interest and note in the diagram are the following entities:

MS 202 WD 206. For example, Mary's WD such as a cellular telephone, BlackBerry, PalmPilot, etc.

MS 202 Personal Computer (PC) 208. For example, one of Mary's home, work, etc. PCs.

WC 210. The provider of service for Mary's WD 206.

MICV 212. As noted above the use of a MICV 212, although not required, provides significant advantages.

SP 204 Web Server (WS) 214. A publicly-available World Wide Web (WWW) site that is optionally provided by SPX 204.

SP 204 Billing Interface (BI) 216. A single, consolidated interface that SPX 204 may use to easily reach, inter alia, one or more external entities such as a credit card or debit card clearinghouse, a carrier billing system, a service bureau that provides access to multiple carrier billing systems, etc.

SP 204 AS 218. Facilities that provide key elements of the instant invention (which will be described below).

It is important to note or observe that in FIG. 2:

1) The MS 202 WD 206 and MS 202 PC 208 entities are illustrated as being adjacent or otherwise near each other. In actual practice the entities may, for example, be physically located anywhere.

2) The messages are shown traversing a MICV 212.

3) The SP 204 may employ a Short Code (SC) or a regular Telephone Number (TN) as its source address (and to which it would ask users of its service to direct any messages). While the abbreviated length of a SC (e.g., five digits for a SC administered by Neustar under the Common Short Code [CSC] program) incrementally enhances the experience of a MS 202 (e.g., the MS 202 need remember and enter only a few digits as the destination address of a message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "UNIVERSAL SHORT CODE ADMINISTRATION FACILITY," which is incorporated herein by reference.

In FIG. 2 the exchanges that are collected under the designation Set 1 represent the activities that might take place as Mary (our MS 202) completes a registration process with SP$_x$ 204. For example:

A) Mary 202 uses one of her PCs 208 to visit a WS 214 that is offered by SP$_x$ 204 to, possibly among other things, complete a service registration process (220→222).

B) SP$_x$'s 204 WS 214 interacts with SP$_x$'s 204 AS 218 to, possibly among other things, commit some or all of the information that Mary 202 provided to a data repository (e.g., a database), optionally complete a billing transaction, etc. (224).

C) As appropriate and as required a BI 216 completes a billing transaction (226→230).

D) SP$_x$'s 204 WS 214 responds appropriately (e.g., with the presentation of a confirmation message, etc.) (234→236).

The specific exchanges that were described above (as residing under the designation Set 1) are illustrative only and it will be readily apparent to one of ordinary skill in the relevant art that numerous other exchanges are easily possible and indeed are fully within the scope of the present invention. As just one example, the registration process may be completed through any combination of one or more channels including, inter alia, the indicated WWW facility, wireless messaging (SMS, MMS, IMS, etc.), E-Mail messages, IM exchanges, conventional mail, telephone, Interactive Voice Response (IVR) facilities, etc.

During the registration process that was described above a range of information may be captured from a MS including, inter alia:

1) Identifying Information (e.g., general information about Mary). For example, possibly among other things, a unique identifier and a password, optionally a pseudonym or handle, name, address, age, etc.

2) Billing Information. Different service billing models may be offered by SPX including, possibly inter alia, free (e.g., possibly advertising-based), a fixed one-time charge, a recurring (monthly, etc.) fixed charge, a recurring (monthly, etc.) variable charge, a per-use charge, etc. Different payment mechanisms may be supported by $SP_x$ including, possibly among other things, credit or debit card information, authorization to place a charge on a MS's phone bill, etc.

3) Locations (e.g., the various physical locations [home, work, schools, stores, etc.] that Mary frequents and which Mary wishes to explicitly identify). For example, possibly among other things, a brief description, the full physical address, etc.

4) Contacts (e.g., all of the different ways that Mary may be contacted [telephone, E-Mail, IM, etc.] and which Mary wishes to make available). For example, possibly inter alia, wireline telephone numbers (e.g., home, work, etc.), wireless telephone numbers (e.g., personal, work, etc.), E-Mail addresses (e.g., personal, work, etc.), IM handles (e.g., personal, work, etc.), Uniform Resource Locators (URLs, for example a personal Web site), etc.

5) Associations (e.g., the mapping or association between a location and a contact along with the relative prioritization [$1^{st}$, $2^{nd}$, etc.] of same).

The specific pieces of information that were described above are illustrative only and it will be readily apparent to one of ordinary skill in the relevant art that numerous other pieces of information are easily possible and indeed are fully within the scope of the present invention.

Figure 4:
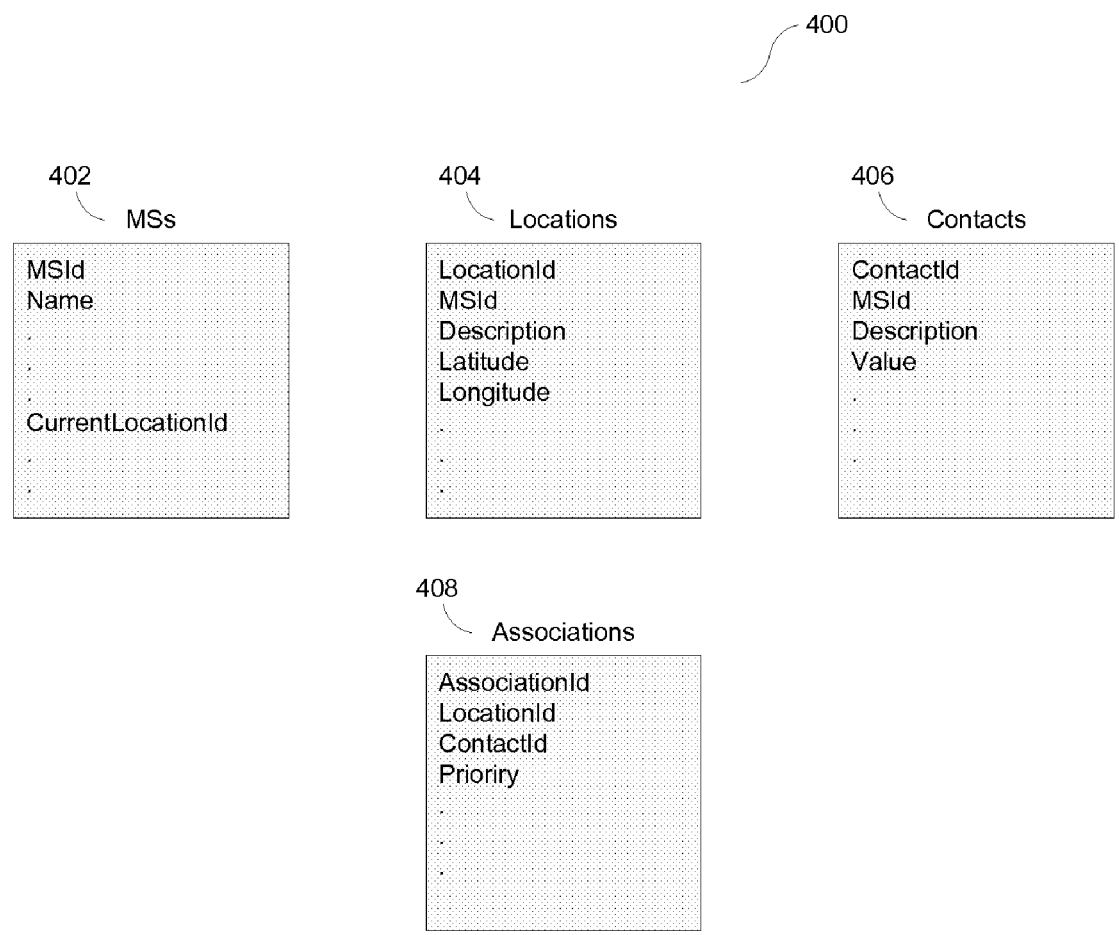
FIG. 4 illustrates elements of an exemplary data model that is supportive of aspects of the present invention.

As noted above the information that Mary provided during the registration process may be preserved in a data repository (e.g., a database) and may optionally be organized as a MS Profile. For purposes of illustration a portion of an exemplary MS Profile data model is presented in FIG. 4 (and reference numeral 400) and selected contents of same are presented in FIG. 5 (and reference numeral 500).

The content of Mary's profile may optionally be augmented by $SP_x$. For example, for each of the identified locations an internal or external data source may be queried to determine the latitude (φ or Phi) and longitude (λ or Lambda) of the location from the physical address of the location.

As noted above, a SP's BI may optionally complete a billing transaction. The billing transaction may take any number of forms and may involve different external entities (e.g., a WC's billing system, a carrier billing system service bureau, a credit or debit card clearinghouse, etc.). The billing transaction may include, inter alia:

1) The appearance of a line item charge on the bill or statement that a MS receives from her WC. Exemplary mechanics and logistics associated with this approach are described in pending U.S. patent application Ser. No. 10/837,695 entitled "SYSTEM AND METHOD FOR BILLING AUGMENTATION." Other ways of completing or performing line item billing are easily implemented by those skilled in the art.

2) The charging of a credit card or the debiting of a debit card.

In FIG. 2 the exchanges that are collected under the designation Set 2 represent the activities that might take place as $SP_x$ 204 registers, coordinates, etc. with WC 210 to, possibly among other things, receive from WC 210 Location Based Services (LBS)-based, Global Positioning System (GPS)-based, etc. location updates regarding or concerning Mary's 202 WD 206 (238→244).

The specific exchanges that were described above (as residing under the designation Set 2) are illustrative only and it will be readily apparent to one of ordinary skill in the relevant art that numerous other exchanges (including, inter alia, a WC 210 optionally explicitly confirming with a MS 202 their desire/acceptance before beginning to provide MS 202 WD 206 location information to a SP 204, updates to various of the information in a MS Profile in a SP's 204 repository, etc.) are easily possible and indeed are fully within the scope of the present invention.

In FIG. 2 the exchanges that are collected under the designation Set 3 represent the activities that might take place as $SP_x$ 204 dispatches to Mary 202 one or more confirmation E-Mail messages (246→248).

The specific exchanges that were described above (as residing under the designation Set 3) are illustrative only and it will be readily apparent to one of ordinary skill in the relevant art that numerous other exchanges (including, inter alia, other types or forms of confirmation messages) are easily possible and indeed are fully within the scope of the present invention.

In FIG. 2 the exchanges that are collected under the designation Set 4 represent the activities that might take place as $SP_x$'s 204 AS 218 dispatches one or more confirmation SMS, MMS, IMS, etc. messages to Mary's 202 WD 206 and Mary 202 replies or responds to the message(s). In the instant example the messages are shown traversing a MICV 212. The SP 204 may employ a SC or a regular TN as its source address (and to which it would ask a MS 202 to direct any reply messages).

The specific exchanges that were described above (as residing under the designation Set 4) are illustrative only and it will be readily apparent to one of ordinary skill in the relevant art that numerous other exchanges are easily possible and indeed are fully within the scope of the present invention.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention.

The information that was described above may be subsequently managed (e.g., existing information may be edited or removed, new information may be added, etc.) through any combination of one or more channels including, inter alia, a SP's WWW facility, wireless messaging (SMS, MMS, IMS, etc.), E-Mail messages, IM exchanges, conventional mail, telephone, IVR facilities, etc.

To continue with our hypothetical example . . . After completing the registration process Mary goes about her normal activities—e.g., she drives to work, she attends meetings, she works in her office, she goes to lunch, she drives home, she attends functions at her children's schools, she goes shopping, she attends sporting events, she travels on business, etc. As Mary moves about her WC provides updates to SPX containing information about the physical location of Mary's WD.

The WC-supplied location updates may consist of any combination of, for example, real-time, periodic, batched, etc. updates and may be conveyed through any combination of, for example, SMS/MMS/IMS/etc. messages, eXtensible Markup Language (XML) documents, custom Application Programming Interfaces (APIs), etc. For purposes of illustration an exemplary XML document might contain, possibly inter alia:

```
<MSLocationUpdate>
    <MSTN>
        <703-555-9876>
    </MSTN>
    <MSLatitude>
        < ϕ₃ >
    </MSLatitude>
    <MSLongitude>
        < λ₃ >
    </MSLongitude>
</MSLocationUpdate>
```

After a SP receives a location update from a WC it may complete one or more processing steps. For example:

1) The TN of the instant MS WD may be extracted from information in the received location update.

2) The Contacts portion of the SP's repository (e.g., see 406 in FIGS. 4 and 506 in FIG. 5) may be queried using the extracted TN to obtain MSId.

3) The latitude (ϕ) and the longitude (λ) of the instant MS WD may be extracted, and/or otherwise obtained or developed, from information in the received location update.

4) The Locations portion of the SP's repository (e.g., see 404 in FIGS. 4 and 504 in FIG. 5) may be queried using (a) MSId, (b) the extracted/obtained/developed/etc. latitude (ϕ) and longitude (λ) and (c) a defined level (+/−) of position granularity or precision to obtain LocationId. (If no match is identified then LocationId of the MS' default 'Other' location may be employed.)

5) The MSs portion of the SP's repository (e.g., see 402 in FIGS. 4 and 502 in FIG. 5) may be updated (using MSId) to preserve LocationId in CurrentLocationId.

The catalog of processing steps that were described above are illustrative only and it will be readily apparent to one of ordinary skill in the relevant art that numerous other processing steps are easily possible and indeed are fully within the scope of the present invention.

To continue with our hypothetical example . . . At any time Mary may optionally submit a location inquiry (i.e., a "Where am I?" test) to determine where SPX believes Mary to be at that moment in time. Such an inquiry may be submitted through any combination of one or more channels including, inter alia, SMS/MMS/IMS/etc. messages, Web-based facility, IM messages, E-Mail messages, telephone call, IVR facility, etc. The returned response message may traverse any combination of one or more of the above channels and may include, possibly inter alia, current location information.

At any time Mary may optionally submit a 'spot' update to fine-tune or otherwise refine the location where $SP_x$ believes Mary to be at that moment in time. Such an update may be submitted through any combination of one or more channels including, inter alia, SMS/MMS/IMS/etc. messages, Web-based facility, IM messages, E-Mail messages, telephone call, IVR facility, etc. An optional response message may traverse any combination of one or more of the above channels and may include, possibly inter alia, confirmation of the update.

Employing interactions similar to those that were just described SPX may optionally dispatch a (SMS/MMS/IMS/etc., IM, etc.) message to Mary the first time that Mary visits each of her defined locations and optionally allow Mary to confirm, refine/correct, etc. same through a 'spot' update.

At any time Mary may optionally submit a contact inquiry (i.e., a "How can I be reached?" test) to determine what SPX believes to be the correct way of contacting Mary at that moment in time. Such an inquiry may be submitted through any combination of one or more channels including, inter alia, SMS/MMS/IMS/etc. messages, Web-based facility, IM messages, E-Mail messages, telephone call, IVR facility, etc. The returned response message may traverse any combination of one or more of the above channels and may include, possibly inter alia, current contact details.

A SP may optionally secure one or more of the interactions that were just described through the appropriate use of an identifier/password mechanism.

To continue with our hypothetical example . . . At any time an interested third-party may submit a contact inquiry for a MS (i.e., a 'How may I reach Mary?' inquiry). Such an inquiry may be based on any combination of one or more identifiers such as, possibly inter alia, name, TN, E-Mail address, IM handle, etc. Such an inquiry may be submitted through any combination of one or more channels including, inter alia, SMS/MMS/IMS/etc. messages, Web-based facility (at a URL such as ContactMe.com or HowToReachMe.com), IM messages, E-Mail messages, telephone call, IVR facility, etc.

After a SP receives a contact inquiry it may complete one or more processing steps. For example:

1) The identifier of the instant MS (e.g., name, TN, E-Mail address, IM handle, etc.) may be extracted from information in the received contact inquiry.

2) The Contacts portion of the SP's repository (e.g., see 406 in FIGS. 4 and 506 in FIG. 5) may be queried using the extracted identifier to obtain MSId. (If no match is identified then a 'Not Found' failure response may be returned.)

3) The MSs portion of the SP's repository (e.g., see 402 in FIGS. 4 and 502 in FIG. 5 [and reference numeral 500]) may be queried using MDId to obtain CurrentLocationId.

4) The Associations portion of the SP's repository (e.g., see 408 in FIGS. 4 and 508 in FIG. 5) may be queried using (Current)LocationId and a Priority of 1 to obtain ContactId.

5) The Contacts portion of the SP's repository (e.g., see 406 in FIGS. 4 and 506 in FIG. 5) may be queried using ContactId to obtain Value.

6) The obtained Value may be returned to the requestor in a response message (which may traverse any combination of one or more of the above identified channels—e.g., SMS/MMS/IMS/etc. messages, IM messages, E-Mail messages, etc.).

The catalog of processing steps that were described above are illustrative only and it will be readily apparent to one of ordinary skill in the relevant art that numerous other processing steps are easily possible and indeed are fully within the scope of the present invention.

For purposes of illustration consider for a moment a simple example that makes use of the exemplary data model contents that are presented in FIG. 5 (and reference numeral 500):

1) An interested third-party wishes to contact Mary and therefore submits a contact inquiry to $SP_x$ based on Mary's personal E-Mail address (i.e., Mary37@SomeMailSvc.com).

2) The Contacts portion of the SP's repository (e.g., see 406 in FIGS. 4 and 506 in FIG. 5) may be queried using the supplied identifier (Mary37@SomeMailSvc.com) to obtain MSId (1001 in the instant case).

3) The MSs portion of the SP's repository (e.g., see 402 in FIGS. 4 and 502 in FIG. 5) may be queried using MDId (1001 in the instant case) to obtain CurrentLocationId (2003 in the instant case).

4) The Associations portion of the SP's repository (e.g., see 408 in FIGS. 4 and 508 in FIG. 5) may be queried using (Current)LocationId (2003 in the instant case) and a Priority of 1 to obtain ContactId (3004 in the instant case).

5) The Contacts portion of the SP's repository (e.g., see 406 in FIGS. 4 and 506 in FIG. 5) may be queried using ContactId (3004 in the instant case) to obtain Value (703-555-3456 in the instant case).

6) The obtained Value (703-555-3456 in the instant case) may be returned to the requester in a response message.

Using the contact details that are included in a response message a requester may attempt to contact/reach the instant MS. If the attempt is unsuccessful the requester may optionally submit another contact inquiry in which case a SP may leverage its internal tracking or state maintenance to identify the new contact inquiry as inquiry number 2 and thus change the Priority designation in the Associations query from 1 to 2. If the contact attempt using the details returned in the second response message is unsuccessful and (yet) another contact inquiry is submitted the SP may change the Priority designation in the Associations query from 2 to 3. Such a cycle may continue until the available contacts are exhausted at which point a 'No Further Contacts Available' response message may be returned to the requester.

A SP may optionally require that an interested third-party complete a registration process before the third-party is allowed to submit contact inquiries. Such a registration process may employ one or more aspects/elements of Mary's registration process that was described above. Through such a registration process a SP may optionally associate an identifier/password to a third-party and may optionally require that a third-party supply those credentials each time that they submit a contact inquiry.

If $SP_x$ were to require such third-party registration then SPX may optionally allow Mary to, possibly inter alia:

1) Explicitly identify those third parties to whom Mary wishes to grant inquiry access. Any other (i.e., unidentified) third-party inquirer might receive, for example, a 'Not Authorized' response message.

2) Dynamically change the content, etc. of a response message based on the identity of an inquirer—e.g., if Mary's husband were inquiring then the TN of Mary's WD might always be returned; if one of Mary's friends were inquiring then Mary's work E-Mail address might be returned; etc. Additionally, specific information about Mary—e.g., her vCard, her personal or professional Web site URL, etc.—may also be conditionally included in a response message based on the identity of an inquirer.

Such processing and response message behavior may be directed through a body of flexible, extensible, dynamically configurable, and easily managed rule sets.

A SP may optionally provide any number of value-add additions to the core functionality that was described above. Such additions may carry an incremental (one-time, recurring, etc.) fee or charge. For example, a SP may offer:

1) Alerts. For example, Mary may indicate that she would like (e.g., for tracking purposes) that an alert to, or an indication of, each incoming contact inquiry be directed to a specified destination (e.g., TN, E-Mail address, IM address, etc.).

2) Diversion. For example, Mary may indicate that in addition to contact inquiries that actual (SMS/MMS/IMS, etc.) messages should also be subject to similar rule-based diversion or re-direction. Under such a message diversion scheme a MICV may, as just one example, 'intercept' incoming messages and appropriately re-direct them (based on, possibly inter alia, flexible, extensible, dynamically configurable, and easily managed routing, etc. rules; additional interactions with an SP; etc.).

3) Directories. For example, in a corporate setting an on-line directory of all employees (with real-time indicators for the current locations and/or the current contact vehicles for each employee) may be offered through, among other channels, a Web-based facility. Such a directories may be augmented or enhanced by, possibly among other means, tying into existing corporate (employee, telephone, etc.) directories. Such directories may facilitate, for example, intelligent searches—'Who is the most senior employee with skills/knowledge X, Y, and Z who is currently in building 3 of the corporate office campus?'

A SP may optionally provide a first responder, legal intercept, etc. capability through which any of the exchanges or interactions that were described above may be monitored, transparently altered or modified, etc.

The confirmation, response, etc. message(s) that were described above may include any number of textual, visual, etc. information elements. For example, various response messages may contain an XML document similar to (as one simple illustrative example):

```
<ContactInformation>
    <703-555-3456>
</ContactInformation>
```

The confirmation, response, etc. message(s) that were described above may optionally contain an informational element—e.g., a relevant or applicable factoid about a specific drug, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a LBS facility).

The confirmation, response, etc. message(s) may optionally contain advertising—e.g., textual material if an SMS model is being utilized, or multimedia (images of brand logos, sound, video snippets, etc.) material if an MMS model is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS facility).

The confirmation, response, etc. message(s) may optionally contain promotional materials (e.g., still images, video clips, etc.).

Figure 3:
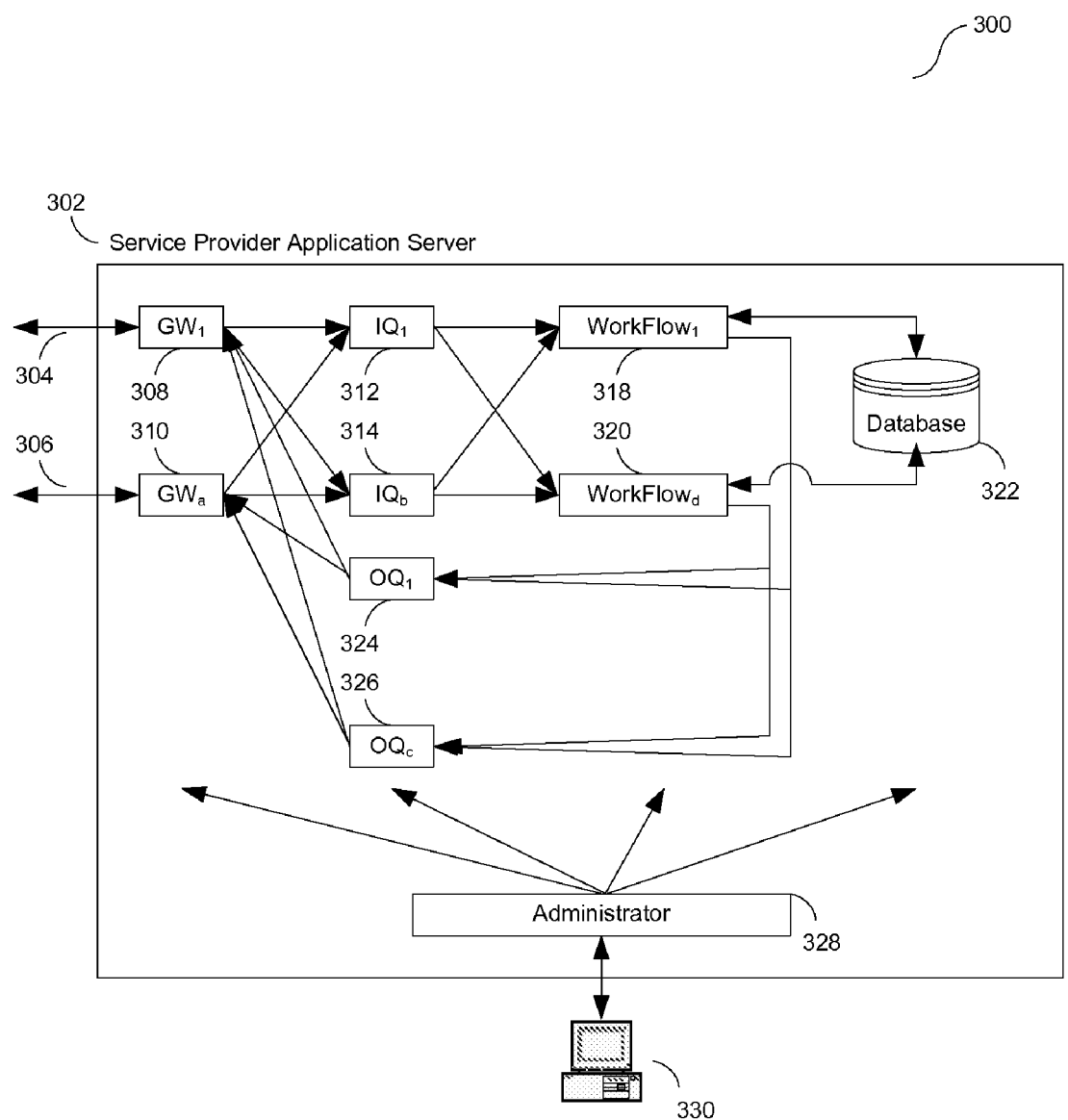
FIG. 3 is a diagrammatic presentation of aspects of an exemplary SP Application Server (AS).

FIG. 3 and reference numeral 300 provide a diagrammatic presentation of aspects of an exemplary SP AS 302. The illustrated AS 302 contains several key components—Gateways ($GW_1$ 308 →$GW_a$ 310 in the diagram), Incoming Queues ($IQ_1$ 312 →$IQ_b$ 314 in the diagram), WorkFlows ($WorkFlow_1$ 318 →$WorkFlow_d$ 320 in the diagram), Database 322, Outgoing Queues ($OQ_1$ 324 →$OQ_c$ 326 in the diagram), and an Administrator 328. It will be readily apparent to one of ordinary skill in the relevant art that numerous other components are possible within an AS 302.

A dynamically updateable set of one or more Gateways ($GW_1$ 308 →$GW_a$ 310 in the diagram) handle incoming (e.g., SMS/MMS/IMS/etc. messaging, etc.) traffic and outgoing (e.g., SMS/MMS/IMS/etc. messaging, etc.) traffic. Incoming traffic is accepted and deposited on an intermediate or temporary Incoming Queue ($IQ_1$ 312→$IQ_b$ 314 in the diagram) for subsequent processing. Processed artifacts are removed from an intermediate or temporary Outgoing Queue ($OQ_1$ 324→$OQ_c$ 326 in the diagram) and then dispatched.

A dynamically updateable set of one or more Incoming Queues ($IQ_1$ 312→$IQ_b$ 314 in the diagram) and a dynamically updateable set of one or more Outgoing Queues ($OQ_1$ 324→$OQ_c$ 326 in the diagram) operate as intermediate or temporary buffers for incoming and outgoing traffic.

A dynamically updateable set of one or more WorkFlows (WorkFlow$_1$ 318→WorkFlow$_d$ 320 in the diagram) remove incoming traffic from an intermediate or temporary Incoming Queue ($IQ_1$ 312→$IQ_b$ 314 in the diagram), perform all of the required processing operations (more about this below), and deposit processed artifacts on an intermediate or temporary Outgoing Queue ($OQ_1$ 324→$OQ_c$ 326 in the diagram).

The Database 322 that is depicted in FIG. 3 is a logical representation of the possibly multiple physical repositories that may be implemented to support, inter alia, configuration, profile, monitoring, alerting, etc. information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

As depicted in FIG. 3 an Administrator 328 provides management or administrative control over all of the different components of an AS 302 through, as one example, a WWW-based interface 330. It will be readily apparent to one of ordinary skill in the relevant art that numerous other interfaces (e.g., a data feed, an API, etc.) are easily possible.

Through flexible, extensible, and dynamically updatable configuration information a WorkFlow component may be quickly and easily realized to support any number of activities. For example, WorkFlows might be configured to support a registration process; to support interactions with a WC; to support the receipt and processing of location updates from WCs; to support the generation and dispatch of confirmation, response, etc. messages; to support various billing transactions; to support the generation of scheduled and/or on-demand reports; etc. The specific WorkFlows that were just described are exemplary only; it will be readily apparent to one of ordinary skill in the relevant art that numerous other WorkFlow arrangements, alternatives, etc. are easily possible.

A SP may maintain a repository (e.g., a database) into which selected details of all administrative, messaging, etc. activities may be recorded. Among other things, such a repository may be used to support:

1) Scheduled (e.g., daily, weekly, etc.) and/or on-demand reporting with report results delivered through SMS, MMS, IMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, IMS, etc. messages; through E-Mail; through a WWW-based facility; etc.

It is important to note that while aspects of the discussion that was presented above focused on the use of SCs, it will be readily apparent to one of ordinary skill in the relevant art that TNs and other message address identifiers are equally applicable and, indeed, are fully within the scope of the present invention.

The discussion that was just presented referenced two specific wireless messaging paradigms—SMS and MMS. These paradigms potentially offer an incremental advantage over other paradigms in that native support for SMS and/or MMS is commonly found on a WD that a potential MS would be carrying. However, it is to be understood that it would be readily apparent to one of ordinary skill in the relevant art that other paradigms (IMS, etc.) are fully within the scope of the present invention.

The foregoing disclosure of the preferred embodiments of the present invention, which was described in the narrative and which was illustrated in the accompanying figures, has been presented for purposes of illustration and description. It is not intended to be exhaustive or to limit the invention to the precise forms disclosed. It will be readily apparent to one of ordinary skill in the relevant art that numerous alternatives to the presented embodiments are easily possible and, indeed, are fully within the scope of the present invention.

The following list defines acronyms as used in this disclosure.

| Acronym | Meaning |
| --- | --- |
| API | Application Programming Interface |
| AS | Application Server |
| BI | Billing Interface |
| CSC | Common Short Code |
| DBMS | Database Management System |
| E-Mail | Electronic Mail |
| FAX | Facsimile Transmission |
| GPS | Global Positioning System |
| GW | Gateway |
| IM | Instant Messenger |
| IMS | IP Multimedia Subsystem |
| IP | Internet Protocol |
| IQ | Incoming Queue |
| IVR | Interactive Voice Response |
| LA | Location Awareness |
| LBS | Location Based Service |
| MICV | Messaging Inter-Carrier Vendor |
| MMS | Multimedia Message Service |
| MS | Mobile Subscriber |
| ODBMS | Object Database Management System |
| OQ | Outgoing Queue |
| PC | Personal Computer |
| RDBMS | Relational Database Management System |
| RTP | Real-time Transport Protocol |
| SC | Short Code |
| SIMPLE | Session Initiation Protocol for Instant Messaging and Presence Leveraging Extensions |
| SIP | Session Initiation Protocol |
| SMS | Short Message Service |
| SP | Service Provider |
| TN | Telephone Number |
| UC | Unified Communications |
| UM | Unified Messaging |
| WC | Wireless Carrier |
| WD | Wireless Device |
| WF | WorkFlow |
| WS | Web Server |
| WWW | World Wide Web |
| XML | Extensible Markup Language |
| XMPP | Extensible Messaging and Presence Protocol |

What is claimed is:

1. A method for location transparency, comprising:

receiving a location update from a Wireless Carrier indicative of the current physical location of a Mobile Subscriber's Wireless Device;

performing one or more processing steps on said location update using at least in part information previously supplied by said Mobile Subscriber;

updating one or more elements within a repository with the results of said processing steps;

receiving a first contact inquiry from a requestor;

dispatching a first response messages to said requestor, said first response message containing at least current contact information based on a first priority;

receiving a second contact inquiry from said requestor; and dispatching a second response message to said requestor, said second response message containing at least contact information different from said first contact information and being based on a second priority, wherein said first priority and said second priority are part of said information previously supplied by said Mobile Subscriber and said second priority is selected as a consequence of receiving said second contact inquiry from said requestor, and wherein the contact information includes a telephone number at which said Mobile Subscriber can be reached, the telephone number being selected based on said current physical location of a Mobile Subscriber's Wireless Device.

2. The method of claim 1, wherein said location update is received continuously.

3. The method of claim 1, wherein said location update is received periodically on a scheduled basis.

4. The method of claim 1, wherein said location update contains at least a latitude value and a longitude value.

5. The method of claim 1, wherein said information is defined by said Mobile Subscriber during a registration process.

6. The method of claim 5, wherein information gathered during said registration process includes one or more of Identifying Information, Billing Information, Locations, Contacts, and Associations.

7. The method of claim 5, wherein information gathered during said registration process is preserved through a User Profile.

8. The method of claim 5, wherein said registration process is Web-based.

9. The method of claim 5, wherein said registration process includes a billing component.

10. The method of claim 1, further comprising:
receiving a location inquiry from a requestor;
performing one or more processing steps on said location inquiry; and
dispatching one or more response messages to said requestor, said response message containing at least current location information.

11. The method of claim 10, wherein said location inquiry is submitted through at least one of a Short Message Service message, Multimedia Message Service message, IP Multimedia Subsystem message, Instant Messenger message, E-Mail message, or a Web-based facility.

12. The method of claim 10, wherein said response messages are delivered through at least one of a Short Message Service message, Multimedia Message Service message, IP Multimedia Subsystem message, Instant Messenger message, E-Mail message, or a Web-based facility.

13. The method of claim 10, wherein said response messages contain advertising and/or promotional material.

14. The method of claim 1, wherein said first and second contact inquiries are submitted through at least one of a Short Message Service message, Multimedia Message Service message, IP Multimedia Subsystem message, Instant Messenger message, E-Mail message, or a Web-based facility.

15. The method of claim 1, wherein said first and second response messages are delivered through at least one of a Short Message Service message, Multimedia Message Service message, IP Multimedia Subsystem message, Instant Messenger message, E-Mail message, or a Web-based facility.

16. The method of claim 1, wherein said first and second response messages contain advertising and/or promotional material.

17. The method of claim 1, further comprising:
receiving a spot update from said Mobile Subscriber;
performing one or more processing steps on said spot update; and
updating one or more elements within a repository with the results of said processing steps.

* * * * *